July 25, 1961
W. A. STEWART
2,993,972
SWITCH AND CONTROL
Filed Sept. 17, 1958
3 Sheets-Sheet 2
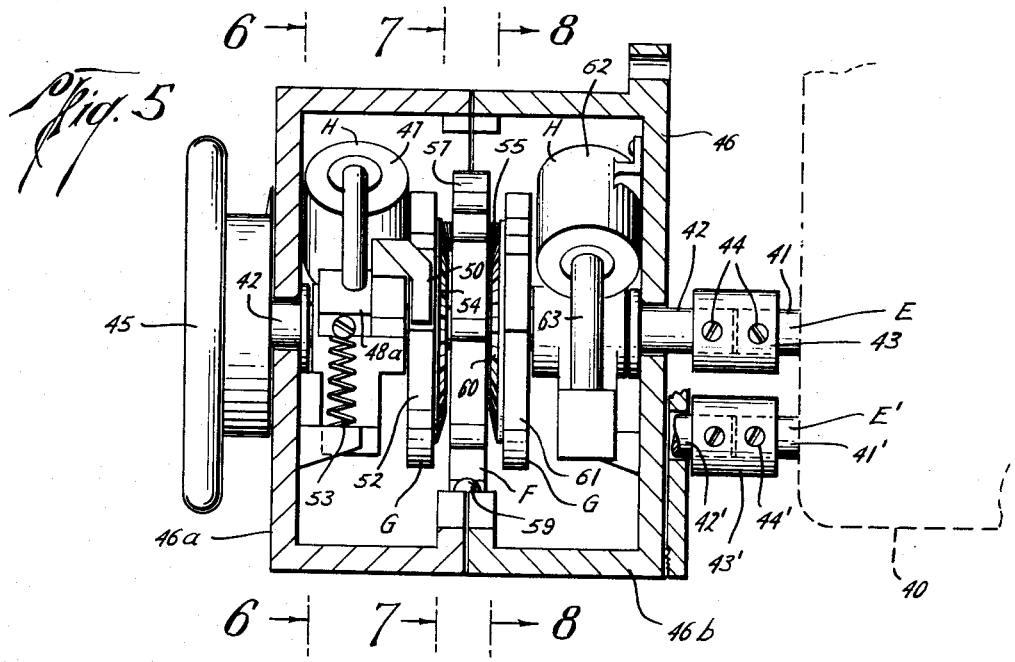
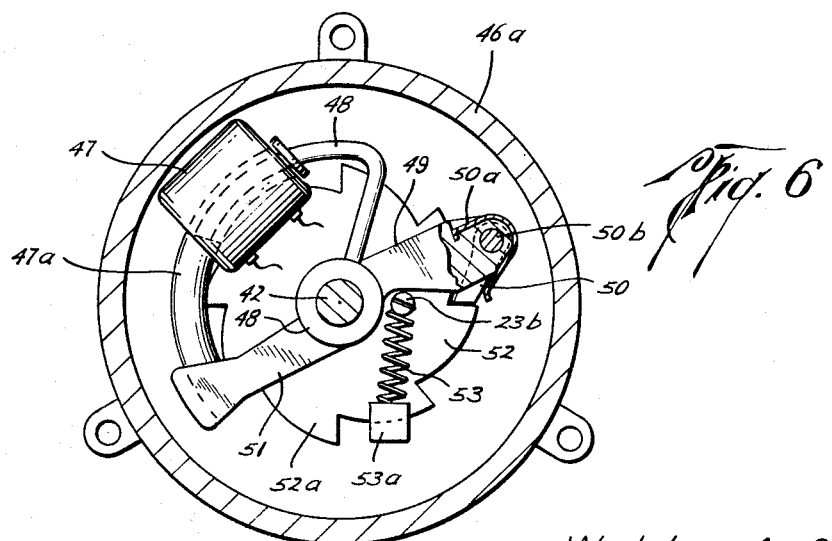
Weldon A. Stewart
INVENTOR.
BY
ATTORNEYS

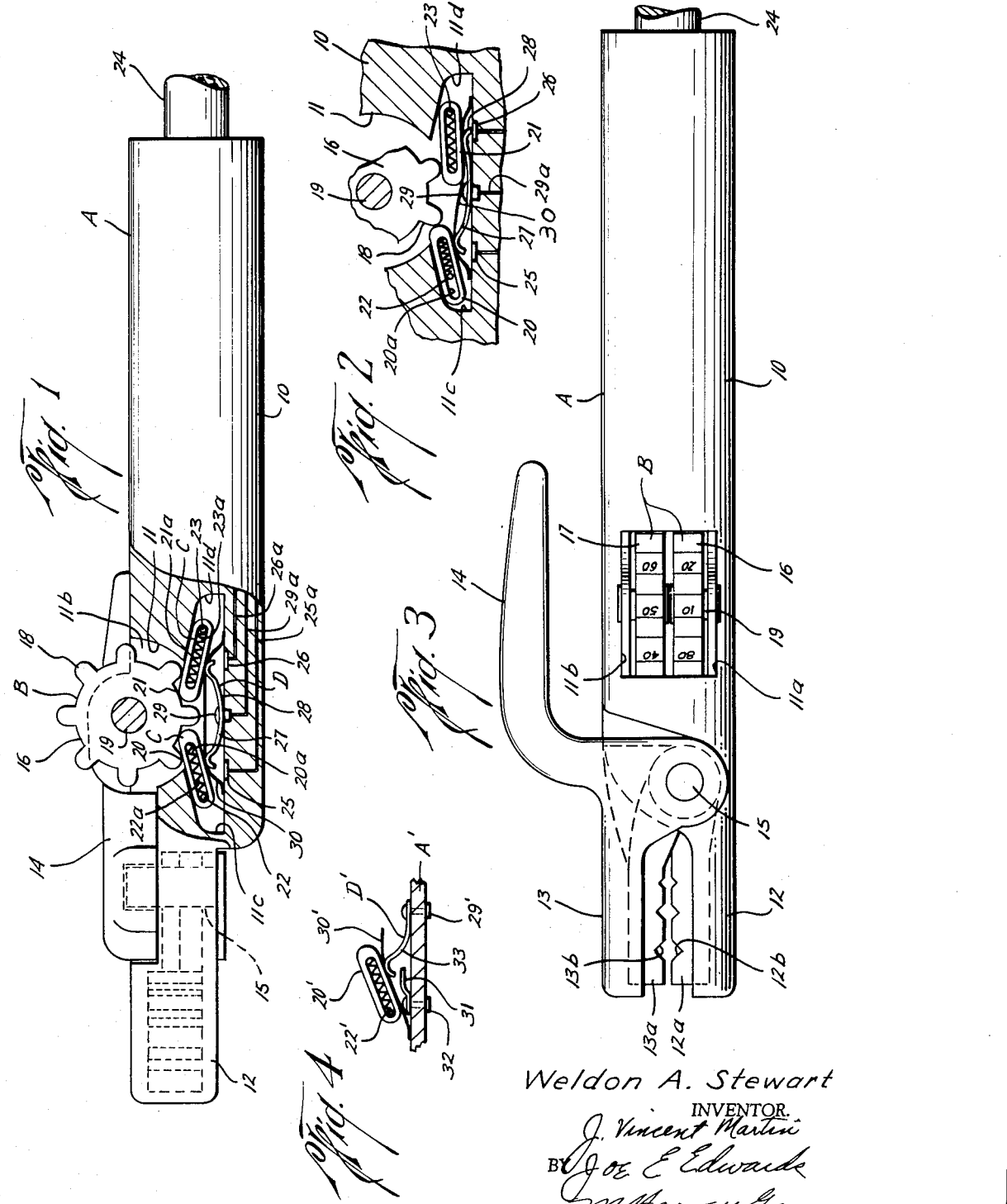

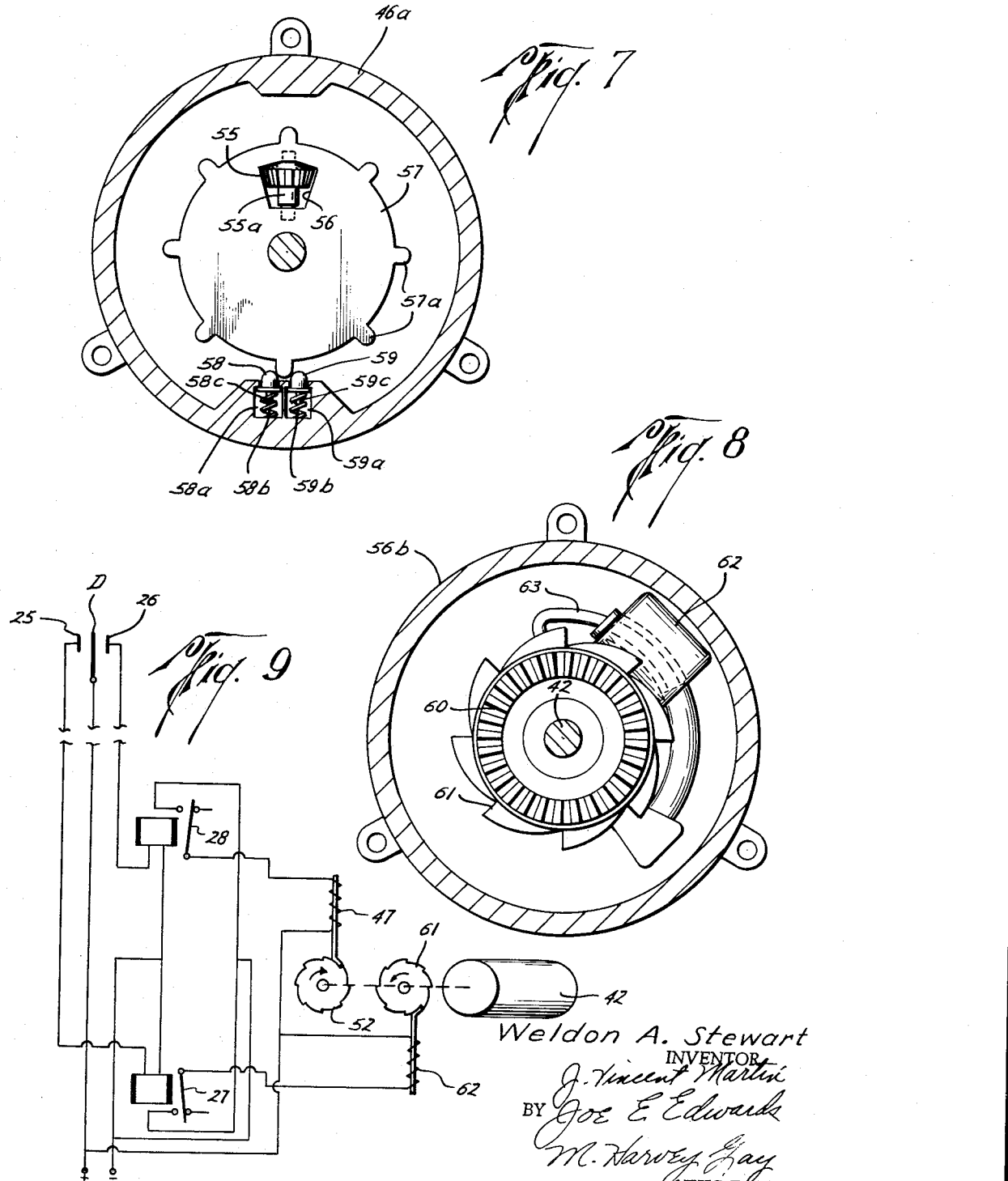

United States Patent Office 2,993,972
Patented July 25, 1961

2,993,972
SWITCH AND CONTROL
Weldon A. Stewart, 1220 Congress, Austin 4, Tex.
Filed Sept. 17, 1958, Ser. No. 761,558
7 Claims. (Cl. 200—157)

This invention relates to an improved switch and remote control system.

In the use of portable arc welding machines, the welder is frequently at great distances from the welding generator. The amount of current necessary in welding under changed conditions varies. It is often desirable for the welder to vary the voltage and amperage output of the generator during welding due to varying conditions and this is difficult if the welder is at some distance from the generator since the welder must leave the job site and return to the generator for making the necessary manual adjustments to vary the output of the generator.

Many factors account for the desirability of varying the voltage and amperage characteristics of the generator such as the different types of work upon which the welding operation is being carried out and the different types of welding rods which may be used on the job. In a welding operation on a run of pipe, for example, a better weld would result if the amperage were varied as the torch is moved around the pipe. Controls are usually at the generator and since it is so troublesome for the welder to go to the generator it often happens that the less desirable generator output is used rather than occasioning the trouble of returning to the generator. Many remote control systems have been contemplated for changing the voltage and amperage characteristics of the generator from a point adjacent the work, however, these have proved undesirable because of the complexity of the systems, the expense involved, the excessive weight of the parts as well as for many other reasons.

Accordingly, it is an object of this invention to produce an improved impulse switch which will be compact, rugged and safe for operation under all conditions.

Another object of this invention is to provide an improved impulse switch and remote control for operating a welding generator and the like.

Another object of this invention is to provide an improved switch which will be of reduced size and weight so as to be readily accomodated within a welding rod holder.

Another object of this invention is to provide an improved remote control for voltage and amperage characteristics of a generator and the like.

Another object of this invention is to provide an improved control system for a welding generator provided with a control shaft for automatically controlling the voltage and amperage characteristics of the generator.

Still another object of this invention is to produce a simple, safe and economical switch and control for the output of a welding generator which will be compact and highly resistant to shock.

Yet another object of this invention is the provision of a switch and control system for remotely controlling the characteristics of a welding generator which will be easy to operate and which will produce a predetermined output from the generator.

The construction designed to carry out the invention will be hereinafter described, together with other features thereof.

The invention will be more readily understood from a reading of the following specification and by reference to the accompanying drawings forming a part thereof, wherein examples of the invention are shown and wherein:

FIGURE 1 is a side elevation of a welding rod holder, with parts broken away, showing a device constructed in accordance with the present invention operably associated therewith, FIGURE 2 is an enlarged view of a central portion of FIGURE 2 showing a portion of the switch constructed in accordance with the present invention, FIGURE 3 is a plan view of the welding rod holder shown in FIGURE 1, FIGURE 4 is a side elevation similar to FIGURE 2 showing a device constructed in accordance with a modified form of the invention, FIGURE 5 is a side elevation, partly in section, showing a control device constructed in accordance with the present invention, FIGURE 6 is a transverse sectional view taken on the line 6—6 in FIGURE 5, FIGURE 7 is a transverse sectional view taken on the line 7—7 in FIGURE 5, FIGURE 8 is a transverse sectional view taken on the line 8—8 in FIGURE 5, and FIGURE 9 is a wiring diagram showing the electrical connections for devices constructed in accordance with the present invention.

Referring more particularly to the drawings FIGURES 1, 2, and 3 show switch means constructed in accordance with a preferred embodiment of the present invention carried within a welding rod holder. The switch is of the impulse type and is positioned within a cavity in the welding rod holder A. The switch includes a rotatably mounted wheel B having spaced projections thereon for moving a pair of pivotally and slidably mounted arms C into and out of engagement with a movable contact member D. It will be noted that a pair of such impulse switch arrangements are provided so that both the voltage and amperage characteristics of the generator may be controlled. The generator is schematically shown in dotted lines in FIGURE 5 having a pair of control shafts E and E′ each of which are capable of turning in two directions for controlling the voltage and amperage, respectively, delivered by the generator. One of the impulse switch arrangements previously described controls a differential F which is carried by the shaft E in fixed relation thereto. Another similar differential (not shown) is carried by the control shaft E′ and is controlled by the other switch arrangement. The differential F is turned by ratchet means G associated with the periphery thereof by electro-mechanical means H which are shown including a pair of solenoids. Thus one of the switches controls the voltage characteristics of the generator by actuating the electro-mechanical means associated therewith for turning the control shaft E in either direction while the other switch operates a similar electro-mechanical device (not shown) which is similarly associated with the shaft E′ for controlling amperage.

The welding rod holder A includes the usual substantially cylindrical support 10 having a recessed portion 11 therein for accommodating the various switch parts. A fixed jaw 12 is carried by the support 10 and projects forwardly thereof to cooperate with a movable jaw 13 for carrying welding rods (not shown) within the jaw pieces 12a and 13a, respectively. A handle 14 is provided for pivoting the movable jaw 13 about its pivot point which is shown in the form of the pin 15. The jaw members 12 and 13 are provided with corresponding notched portions 12b and 13b, respectively, for engaging welding rods of various sizes.

The rotatable switch members B which serve as switch selector knobs are shown in the form of wheels 16 and 17 both of which carry spaced protuberances 18 on the periphery thereof. The wheels 16 and 17 are rotatably mounted on the shaft 19 which is carried within the sides 11a and 11b defining the upper portion of the cavity 11.

The cavity 11 also has lateral extensions thereof 11c and 11d for accommodating the arms C for pivotal and slidable movement therein. The arms C are shown in the form of pillow blocks 20 and 21 which have slots 21a in the medial portions thereof extending longitudinally of the blocks 20 and 21. Pivot pins 22 and 23, each having fixed connection with the support 10, project into the slots 20a and 21a, respectively. Resilient means in the form of compression springs 22a and 23a are confined within the slots 20a and 21a and bear upon the pins 22 and 23, respectively, on one end thereof and against adjacent ends of the slots 20a and 21a on their opposite ends. The various switch parts described above in connection with the wheel 16 are similar to those in the other switch controlled by the wheel 17 so that only one of the switches is described in detail.

The welding rod holder A is carried upon a cable 24 which has electrical conductors for supplying electrical energy for the welding operation and additional conductors 25a and 26a for providing an electrical connection for the contacts 25 and 26, respectively, which are fixed within the lower portion of the cavity 11. The fixed contacts 25 and 26 carried by the holder A are positioned beneath the resilient arms 27 and 28 forming the movable contact D which is secured in the medial portion thereof by a suitable fastening 29 which has fixed connection with the support A. A diaphragm 30, preferably of rubber or rubber composition material, separates the movable contacts D from the arms 20 and 21 and has a suitable sealed connection about its periphery with the holder A within the lower portion of the cavity 11. This diaphragm 30 protects the contacts so that the switch may be used in all weather conditions. The movable contact D is also provided with a suitable electrical connection 29a.

FIGURE 4 shows a switch element constructed in accordance with a modified form of the invention in which like reference characters are used to designate like parts with prime notations added. The fixed contact is shown in the form of a leg 31 which is secured by a bolt 32 to a support A'. The movable member D' consists of only one arm 33 and is provided with suitable fastening means in the form of a bolt 29'. A suitable diaphragm 30' separates the movable contact 33 from the pivoted arm 20'.

A welding generator and the like is shown in dotted lines at 40 in FIGURE 5 and the switch and control device constructed in accordance with the present invention is adapted to be used in connection therewith. The generator 40 is provided with a pair of control shafts E and E' which are both turnable in two directions to operate the parts thereof for regulating the voltage and amperage characteristics of the generator, respectively. The shaft E includes a stub shaft 41 extending from the generator and a second shaft 42 which is coupled with the shaft 41 by the coupling 43 which is attached by set screws 44. The shaft E is manually operable by turning the manual control knob 45 for turning the shaft in either direction.

The shaft 42 is journaled in a split housing 46 having two halves 46a and 46b. The housing portion 46a is positioned adjacent the knob 45 and carries within it electro-mechanical means for actuating the mechanism for turning the shaft E responsive to the operation of the switch previously described. The electro-mechanical means H includes a solenoid 47 which is carried by the casing or housing 46a having suitable fixed connection thereto. The core 47a of the solenoid is carried by a lever arm 48 which is fixed to a collar 48a which is rotatably mounted on the shaft extension 42. The collar 48a has fixed connection with an arm 49 which carries 48a has fixed connection with an arm 49 which carries a pawl 50 having a leaf spring 50a for normally urging the pawl 50 downwardly about the shaft 50b upon which the pawl 50 is pivoted. Another arm 51 is carried by the collar 48a and projects outwardly in a direction opposed to the arm 49 and serves to support the core 47a of the solenoid 47. A ratchet wheel 52 is rotatably carried by the shaft extension 42 closely adjacent the collar 48a and is provided with suitable projections 52a for engagement by the pawl 50 which is off-set so as to engage such projections. The arm 49 is provided with a spring 53 which has connection on one end with the casing 46a as at 53a and with the arm 49 as by the screw 53b, so as to normally urge the arm 49 upwardly in FIGURE 6.

The side of the ratchet wheel 52 remote from the solenoid 47 is provided with a suitable bevel gear 54 for engaging a pinion 55. The pinion 55 is rotatably carried within the recess 56 within the annular member 57 on a stub shaft 55a for meshing with the bevel gear 54. Thus the differential F which includes the annular member 57 which has fixed connection with the shaft 42 turns the shaft for adjusting the output of the generator. Upon the turning of the shaft in a clockwise direction in FIGURE 7 the next succeeding projection 57a carried by the annular member 57 is engaged between a pair of spring biased plungers 58 and 59 which are carried within recessed portions 58a and 59a within the housing 46a. The plungers 58 and 59 are biased upwardly by the coil springs 58b and 59b which surround the stub shafts 58c and 59c upon which the plungers 58 and 59 are mounted. The projections 57a are therefore securely positioned between the plungers 58 and 59 upon an operation of the solenoid 47 responsive to actuating of one of the switches B.

It will be noted in FIGURE 8 that the housing 56b contains similar parts to those shown and described in connection with the shaft 42 contained within the housing 46a. The ratchet wheel 61 has bevel gear 60 also meshing with the bevel gear 55. It will also be noted that the various parts face each in opposed relation and that the solenoid 62 is positioned to turn the shaft 42 in the opposite direction responsive to an impulse actuated by turning the associated switch in an opposite direction.

The other generator control shaft E is provided with a control device contained within the housing 46' which is similar to that just described so that this control for the shaft E' will not be described in detail. Corresponding parts are designated by like reference characters with prime notations added. It will be noted that the stub shaft 41' is joined by the coupling 43' to the shaft extension 42'. Other corresponding parts are not shown but are contained within the housing 46'.

FIGURE 9 shows a wiring diagram for providing electrical connections for the various parts associated with the switch described in detail. The fixed contacts 25 and 26 and the movable contact D are shown schematically positioned to close a circuit across a suitable source of electrical energy. Low current relays, provided to prevent arcing of the contacts 27 and 28, are closed responsive to the closing of contacts 25 and 26, respectively. The closing of either of these contacts energizes the associated solenoid 47 or 62 so that the respective cores will be pulled in thus turning the arms 48 or 63 to adjust the output of the generator. A similar wiring system (not shown) is provided for the other switch actuated by the wheel 17.

In operation, when the rotatable switch member 16 is turned in a clockwise direction in FIGURE 2 one of the projections 18 depresses the pillow block 21 causing same to pivot about its pivot pin 23. This same movement causes the adjacent projection 18 to engage the pillow block 20 sliding same to the left against the action of the spring 25. As the pillow block 21 is pivoted downwardly, the arm 28 of the movable contact is also depressed so as to momentarily engage the fixed contact 26. The projection 18 then rides over the pillow block 21 and is engaged between the pillow blocks 20 and 21. The circuit is thus momentarily completed across the solenoid 47 so as to actuate the electro-mechanical mechanism H by the impulse of electrical energy delivered thereto.

When the core 47a of the solenoid 47 is pulled in the lever 48 causes the arm 49 to be turned in a clockwise direction compressing the spring 53. The pawl 50 engages the ratchet wheel 52 to advance same in a clockwise direction in FIGURE 6 by an amount commensurate with the advancing of one of the projections thereon. The turning of the ratchet wheel is transmitted to the differential F through the gear 54 and pinion 55. The movement of the differential causes the control shaft E to also turn in a clockwise direction to adjust the components of the generator controlled thereby. The core of the solenoid is then returned to normal position by the action of the spring 53. Thus the parts are in position for another movement responsive to engagement of the switch contacts. It is evident that the turning of the rotatable switch member so that one of the projections 18 passes over one of the pillow blocks causes a definite increment of movement of the control shaft E.

It is also evident that by turning the rotatable switch member 16 in a counter-clockwise direction that the electro-mechanical mechanism H' is actuated to turn the control shaft E in a counter-clockwise direction to produce a corresponding adjustment of the generator control mechanism. The other control device, which is not described in detail, is provided for actuation by the rotatable switch member 17 for controlling the amperage characteristics of the generator in a similar manner.

While a preferred embodiment of the invention has been described using specific terms, such description is for illustrative purposes only, and it is to be understood that changes and variations may be made without departing from the spirit or scope of the following claims.

What is claimed is:

1. A switch mechanism including, a support having a cavity therein, an electrical contact within said cavity, a movable member normally held in spaced relation to said contact, a pivoted arm normally positioned in operative relation to said movable member, said arm also being slidable to an inoperative position, resilient means normally urging said arm into operative relation to said movable member, and a rotatably mounted wheel having spaced protuberances thereon carried by said support, whereby upon turning the wheel in one direction one of said protuberances urges said arm into engagement with said movable member to urge same engagement with the contact.

2. A switch mechanism including, a support having a cavity therein, an electrical contact within said cavity, a movable member normally held in spaced relation to said contact, an arm normally positioned in superposed relation to said movable member, said arm having a longitudinal slot therein, a pivot pin carried by said support projecting into said slot, resilient means confined within said slot normally urging said arm into superposed relation to said movable member, and a rotatably mounted wheel having spaced protuberances thereon carried by said support, whereby upon turning the wheel in one direction one of said protuberances urges said arm into engagement with said movable member to urge same into engagement with the contact.

3. The switch mechanism set forth in claim 2, in which said contact is embedded in said support.

4. The switch mechanism set forth in claim 2, in which said contact includes a resilient arm fixed to the support on one end and extending above in spaced relation to the support on the other end thereof for engagement with the movable contact.

5. A switch mechanism including, a support having a cavity therein, a pair of spaced contacts within said cavity, a pair of resilient movable members normally held in spaced relation to said contacts, a pair of pivoted arms normally positioned in operative relation to said movable members, said arms also being slidable to an inoperative position, resilient means normally urging said arms into operative relation to said movable members, and a rotatably mounted wheel having spaced protuberances thereon carried by said support, whereby upon turning the wheel in one direction one of said protuberances urges one of said arms into engagement with one of said movable members to urge same into engagement with one of the contacts while another of said protuberances urges the other of said arms into inoperative position.

6. A switch mechanism including, a support having a cavity therein, a pair of spaced contacts within said cavity, a pair of resilient movable members normally held in spaced relation to said contacts, a pair of spaced arms normally positioned in superposed relation to said movable members, said arms having a longitudinal slot therein, a pivot pin carried by said support projecting into each of said slots, resilient means confined within said slots normally urging said arms into superposed relation to said movable members, and a rotatably mounted wheel having spaced protuberances thereon carried by said support, whereby upon turning the wheel in one direction one of said protuberances urges one of said arms into engagement with one of said movable members to urge same into engagement with one of the contacts while another of said protuberances urges the other of said arms into inoperative position.

7. The structure set forth in claim 6, including, a flexible diaphragm positioned between said arms and said movable members for protecting the contacts and movable members.

References Cited in the file of this patent

UNITED STATES PATENTS

| | | |
|---|---|---|
| 308,548 | Blodgett et al. | Nov. 25, 1884 |
| 1,892,542 | Stearns | Dec. 27, 1932 |
| 1,954,689 | Allen | Apr. 10, 1934 |
| 1,986,527 | Rach et al. | Jan. 1, 1935 |
| 2,151,910 | Grauber | Mar. 28, 1939 |
| 2,243,269 | Tavel | May 27, 1941 |
| 2,717,966 | Jury | Sept. 13, 1955 |
| 2,803,715 | Guth | Aug. 20, 1957 |
| 2,820,856 | Krueger | Jan. 21, 1958 |